Nov. 6, 1951 H. WEIBEL ET AL 2,574,001
PIPE NIPPLE CHUCK
Filed Jan. 12, 1950 2 SHEETS—SHEET 1
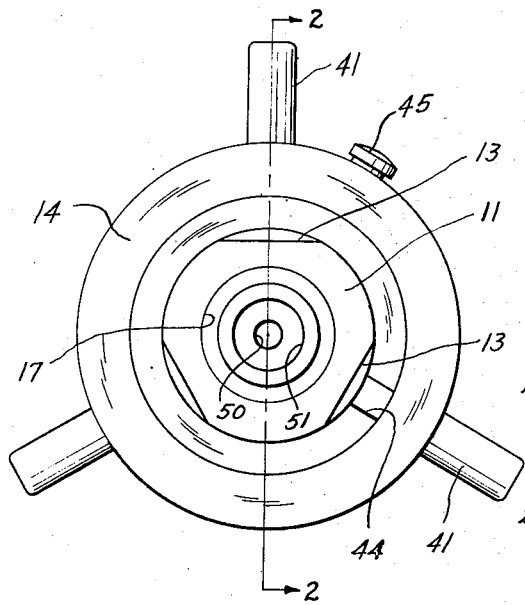
FIG. 1
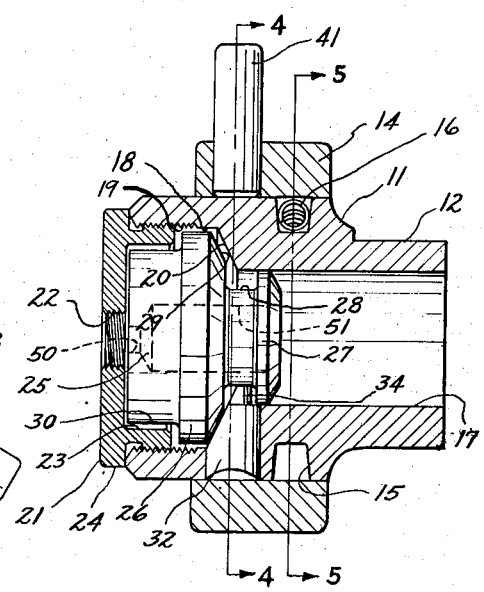
FIG. 2
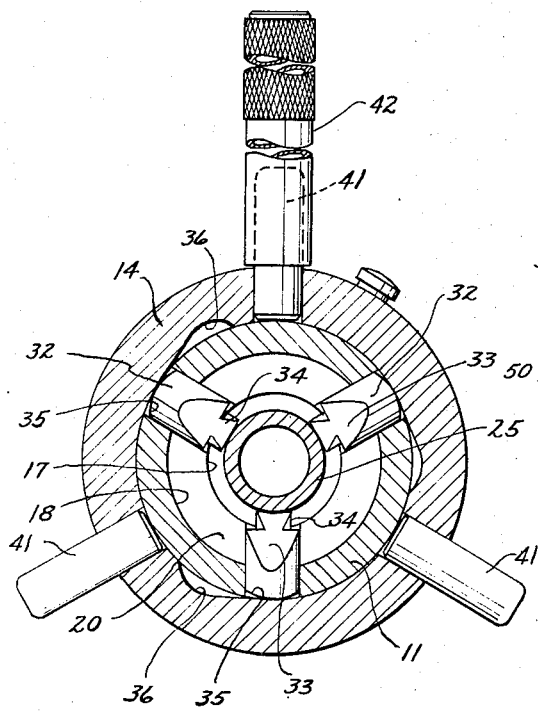
FIG. 4
FIG. 3
INVENTORS
HERMAN WEIBEL
ANTON J. JANIK
BY J. N. Douglas
atty.

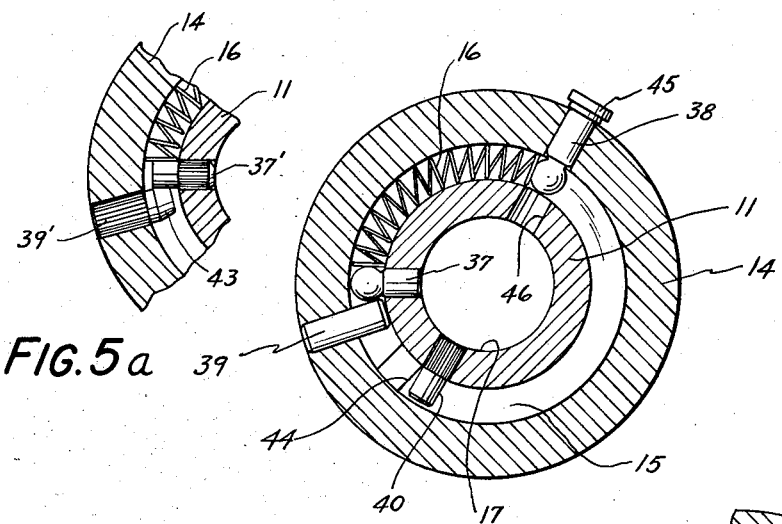
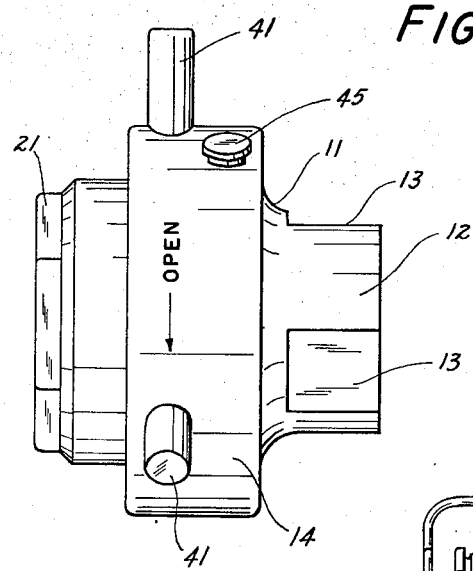
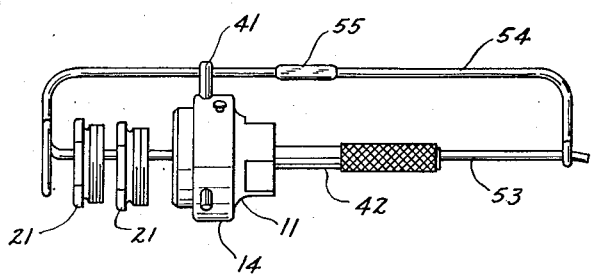
FIG. 5a  FIG. 5  FIG. 5b  FIG. 6  FIG. 7
INVENTORS
HERMAN WEIBEL
ANTON J. JANIK Patented Nov. 6, 1951

2,574,001

UNITED STATES PATENT OFFICE 2,574,001

PIPE NIPPLE CHUCK

Herman Weibel, Lakewood, and Anton J. Janik, Elyria, Ohio, assignors to The Ridge Tool Company, Elyria, Ohio Application January 12, 1950, Serial No. 138,182

2 Claims. (Cl. 81—53)

This invention relates to tools and more particularly to a chuck for holding a short section of threaded pipe or a stud while working on the other end.

In the threading of a short nipple, or stud, after the first end has been threaded, it is impracticable to cut threads on the second end without holding the work piece by the previously threaded end. Therefore, it is desirable to have a device for gripping the threaded end so that the work piece will not turn while the other end is being threaded.

Prior devices included split bushing arrangements where the threads were grasped by a threaded bushing split longitudinally and having a clearance between the bushing parts. These prior devices usually comprised a considerable number of parts. In order to tighten them about a threaded nipple or stud, the bushing was usually provided with a screw and nut arrangement which clamped the parts together. The ultization of the device was a comparatively slow operation.

Other devices utilized a stop member, the pipe being threaded in the bushing and abutting the stop member in order to prevent further movement. This stop member could then be removed from engagement with the pipe end by some external means, and the nipple could be unscrewed from the chuck or bushing. The release means often included eccentric cam members, and the like, and some of the devices utilized the tightening action of two different pitched threads, one on the stop and one on the pipe in a common sleeve. This screwing the sleeve on the threads of different pitches brought the two pieces (nipple and stop member) closer together to clamp the nipple or unscrewed to release it.

Our invention comprises a new type chuck in the general class of those having pipe thread engaging parts and stop members releasably held against the end of the nipple. However, our chuck instead of being normally open or in the released position, is normally closed or in readiness to receive the end of the pipe which may then be threaded and released. As a result, the pipe can never be inadvertently inserted into the chuck and be jammed in place because the chuck was not properly adjusted to receive the pipe. Since the resetting of the present chuck is provided automatically, it is virtually impossible with the present device to have a pipe become jammed in the chuck.

In addition to its use as a nipple chuck, the device may similarly be used as a stud chuck to hold the threaded end of a stud while the other end is threaded. An additional use might be to set the stud, i. e., to be used as a wrench to turn the stud into the hole where it is to be placed. The description of the device as a nipple chuck is, therefore, not intended to limit it to such use.

A more complete understanding of our invention may be had from the following figures throughout which like parts are designated by like reference characters.

In the drawings:

Fig. 1 is an end view of our invention;

Fig. 2 is a longitudinal sectional view on line 2—2 of Fig. 1;

Fig. 3 is a view similar to Fig. 2 showing the stop in its released position;

Fig. 4 is a sectional view on line 4—4 of Fig. 2;

Fig. 5 is a sectional view on line 5—5 of Fig. 2;

Fig. 5a is a fragmentary view similar to Fig. 5 showing an alternative type of pin;

Fig. 5b is also a fragmentary view similar to Fig. 5 showing another pin corresponding to those of Fig. 5a;

Fig. 6 is a side elevational view of the nipple chuck; and

Fig. 7 is a view showing the chuck assembled for carrying.

Briefly, our invention comprises a chuck which is normally in condition to receive a threaded end of a piece and needs no adjustment before receiving the piece. Release of the piece is accomplished by release of a stop member by cam or wedge means, thus allowing a nipple or stud to be unscrewed from the chuck. The cam means for releasing the stop is operated by turning a rotatable sleeve a few degrees by means of handles provided for that purpose.

More specifically, and in connection with its use as a nipple chuck, our device comprises a body portion 11 having one end 12 formed with flat surfaces 13 adapted for engagement with a pipe vise or the chuck of a power drive, or any other type of vise. An adjustment ring 14 is rotatably disposed on a larger diameter outer surface near the midsection of the body portion. An annular groove 15 is cut into this larger diameter section to receive a spring 16 and its end connections more fully described hereinafter.

The inner surface of the body 11 is formed with a bore 17 extending from the vise engaging end 12 through the body. At the opposite end, this bore is enlarged by a counterbore 18 in which threads 19 having the same pitch as standard pipe threads are cut. The diameter of the bore, and the threads are of such proportions as to receive loosely a pipe of the largest size with which the chuck is to be used. The surface 20 between the bore 17 and the counterbore 18 is chamfered at approximately 25 degrees to a diameter of the bore. It will be realized that this angle may vary somewhat without exceeding the scope of our invention.

A series of adaptors 21 may then be provided which may be screwed into these threads 19. These adaptors 21 would be provided with tapped holes 22 of several sizes, each adapted to receive a different size of pipe. A counterbore 23 is provided to receive a stop member 25 more fully described hereinafter. The surface 24 of the adapter 21 which remains outside the body 11 when the adapter is in place may be formed with a hexagonal or square head or a knurled surface to make removal and replacement more convenient.

The stop member 25 is slidably disposed in the bore 17 and counterbore 18 having a central portion 26 of such diameter that it is freely slidable in the counterbore 18 and an end 27 freely slidable in the central bore 17. An annular groove 28 is provided around the end 27 and the surface 29 between this groove 28 and the central portion 26 is formed with a chamfer to match the surface 20 of the body portion of the chuck. The end 30, which extends into the threaded portion of the counterbore, is preferably formed to fit inside a pipe of the largest diameter to be held by the chuck but large enough to abut the end of the next smaller size pipe to be used.

Sliding wedge pins 32 are slidably disposed in holes in the body portion 11. While three pins are shown, and preferred because the pressure will be equalized among them, still it is apparent that more could be used without exceeding the scope of our invention. These pins are formed with a flat surface 33 tapered at approximately the same angle as the chamfered surfaces 20 and 29. At the tapered end, the pin is formed with a portion 34 of smaller radius than that of the body so that the pin may slide into the groove 28. It will be apparent that this formation is not necessary, but it is preferred, since the groove 28 may then be made narrower and therefore the stop made smaller. Arcuate surfaces 35 are provided for the other end of the pins 32 for sliding engagement with the ring 14. The holes for these pins 32 in the body are located longitudinally in a position such that, when the pins are disposed in the holes with the arcuate surfaces 35 flush with the outer diameter of the body, the tapered surfaces 33 force the stop member 25 outwardly a short distance so that the chamfered surface 20 is spaced somewhat from the surface 29 (Fig. 2). It is apparent that a withdrawal of the pins 32 slightly from the holes will allow the stop member to retreat toward the surface 20 almost to the point of engagement between that surface and the surface 29 on the stop member (Fig. 3).

The ring 14 is disposed about the body 11 covering the ends of the wedge pins 32 and normally holds these pins inward in the closed position as shown in Fig. 2. Cam slots 36 are provided, however, in the plane of the pins 32 which will register with all the pins simultaneously. These slots are deep enough that the pins will retract to the position of Fig. 3 when the slots 36 are in register with the pins 32.

The ring is normally held in the position of Fig. 2 by means best shown in Fig. 5. The compression spring 16 is disposed in the groove 15, and is engaged at its ends by ball ended pins. The first pin 37 is pressed into the body portion 11 at the groove 15. The second ball ended pin 38 is pressed into the ring 14 and is engaged by the other end of the spring 16. Thus the spring tends to keep the pins 37 and 38 apart. A stop pin 39 is pressed into the ring 14 in position to engage the pin 37 when the cam slots 36 are out of register with the wedge pins 32. A second stop pin 40 engages the pin 39 upon turning the ring to the proper release position (Fig. 2). Thus the spring 16 urges the ring 14 and body 11 into a position where the pins 32 are held inward and, therefore, the stop member 25 is in position to hold the end of the pipe nipple. Pegs 41 are provided to turn the ring against the spring to release the stop from the end of the nipple, and an auxiliary handle 42 adapted to slip over the pegs 41 may be provided for additional leverage should the chuck be particularly hard to open at any time.

It will be obvious to those skilled in the art that the pins 37 and 38 need not be ball ended. As illustrated in Figs. 5a and 5b, straight ended pins 37' and 38' may be used. If this type pin is used, it is preferable that the stop pin 39' have one end 43 chamfered so that it and the pin 37' do not engage at a sharp edge but on the chamfered surface. Some of the pins are shown in the figures with ribbed ends engaging the surrounding metal and some with smooth ends. It will be recognized that this is not a limitation of the invention but that either can be used interchangeably. The ribbed end is preferred because it engages the surrounding metal more firmly, but the plain ended pin could be shrunk into place or otherwise fixed.

To assemble the device, after the pin 37 and stop pin 40 are pressed into the body 11 and the pegs 41 fixed into the ring 14, the stop member 25 is put in place in the bore and counterbore 18. The sliding pins 32 are then placed in their holes and pushed completely in. The spring 16 is laid in the groove 15 and the ring 14 is slid over the body 11. The ring is then turned so that the pin 38 may be pressed in beyond the end of the spring 16. When this pin 38 is in place, the ring is turned against the spring so that the stop pin 39 may be inserted into the ring behind the ball ended pin 37. It should be noted that the sliding pins 32 are sufficiently long that, even in their fully retracted position, they still project into the groove 28 sufficiently to retain the stop member 25 in place.

For ease in disassembly for repair or replacement purposes, the ball ended pin 38 is formed with a head 45. It is obvious that this pin could be threaded into the ring 14 as well as pressed in as described above. Still another alternative is illustrated in Fig. 5b where the pin 38' is headless. A hole 46 having a diameter larger than the pin may then be provided in the body member 11 through which the pin 38' may be driven for disassembly. To disassemble, then, the pin 38 is first withdrawn, or the pin 38' driven in, releasing the spring 16. A slot 44 is provided into the groove 15, and the stop pin 39 is brought into register with this slot, and the ring 14 can then be slid off the body portion 11 and the complete device disassembled.

The operation of the assembled device is clear. With the device in its normal or "closed" position, and the proper adaptor 21 screwed into place, the threaded end of the nipple or stud is screwed into the hole 22 against the stop member 25. The piece may then be threaded while the flat surfaces 13 are held in a proper vise. After the threading operation, the work piece is released by turning the ring 14 until the sliding pins 32 retract, thereby releasing the stop member 25. Since the threads in the tapped hole 22 are a loose fit with the threads on the work piece, the piece can then be unscrewed from the adaptor 21 by hand. The ring is then released to spring back to its closed position ready to receive the next piece. To adapt the chuck to receive any other size piece a different adaptor 21 may be screwed into place and the operation of the device is the same.

It will be apparent to those skilled in the art that the mode of operation would be exactly the same for threading a stud as for a nipple. The device may also be used as a stud or nipple wrench by clamping the stud or nipple in the device, then threading the stud or nipple into its mating female thread, using the handle 42 for leverage to provide the requisite torque. The wrench may then be released in the same manner as a stud or nipple would be released from the chucking action of the device.

In order to adapt the device for ease in carrying, a hole 50 is drilled through the face of the stop member 25. This hole is smaller than the smallest pipe which is to be held in the chuck. The hole 50 extends into a larger hole 51 drilled from the rear of the stop member and which is large enough that the auxiliary handle 42 may slide easily into it. The handle 42 is tubular so that when it is slipped into the hole 51, there is a continuous opening extending through the device. It is then possible to thread the chuck over one arm 53 of a carrier 54 similar to the one described in the Patent No. 2,219,721 issued October 29, 1940, to Carl H. Ingwer and Clyde E. Wright. This carrier works somewhat on the principle of a common safety pin to hold the chuck and the accessories including the handle 42 and a series of adaptors 21. A grip 55 may be provided for additional ease of carrying.

It is apparent that we have provided a chuck adaptable to many sizes of work pieces and which is normally in a closed position which will prevent jamming of the device. It is very convenient to use and to carry and requires a minimum of extra parts to change from one size to another.

Having thus described our invention, we are aware that numerous and extensive departures may be made therefrom without departing from the spirit or scope of the invention.

We claim:

1. A tool of the class described comprising a body adapted to hold a workpiece and formed with a central bore, a stop plug slidably disposed in said bore, said plug being formed with a cam surface and a pin-receiving portion adjacent said cam surface, a plurality of wedge pins slidably disposed in said body and having tapered surfaces adapted to engage said cam surface, said plug having a part on the side of said pin-receiving portion adapted to engage said pins to limit the movement of said plug, and ring means rotatable on said body formed with cam surfaces adapted to engage the ends of said pins to move them and thereby to determine the position of said plug.

2. A tool of the class described comprising a body formed to provide a central bore, adapter means threaded into said bore at one end of said body, a stop plug slidably disposed in said bore having an abutment face toward said adapter means, said plug being formed to provide a frustro-conical cam surface thereon, and an annular groove adjacent said cam surface, a plurality of wedge pins slidably disposed in said body radially thereof, said pins extending into said groove and having a tapered surface adapted to engage said cam surface on said plug, ring means rotatable on said body and having cam surfaces adapted to engage said pins, and spring means engaged between said ring means and said body to urge said ring means to a position in which said pins are urged towards the longitudinal centerline of said bore.

HERMAN WEIBEL.
ANTHONY J. JANIK.

REFERENCES CITED

The following references are of record in the file of this patent:

UNITED STATES PATENTS

| Number | Name | Date |
|---|---|---|
| 792,791 | Rich | June 20, 1905 |
| 1,740,377 | Snyder et al. | Dec. 17, 1929 |
| 2,069,527 | Kirkland | Feb. 2, 1937 |
| 2,220,654 | Kirkland | Nov. 5, 1940 |
| 2,408,335 | Oliver et al. | Sept. 24, 1946 |

FOREIGN PATENTS

| Number | Country | Date |
|---|---|---|
| 10,489 | Great Britain | 1895 |
| 191,960 | Great Britain | Jan. 25, 1923 |
| 478,950 | Germany | July 6, 1928 |